(12) United States Patent
Tatsumi et al.

(10) Patent No.: US 7,560,094 B2
(45) Date of Patent: Jul. 14, 2009

(54) MODIFIED LAYERED METALLOSILICATE MATERIAL AND PRODUCTION PROCESS THEREOF

(75) Inventors: Takashi Tatsumi, Kawasaki (JP); Peng Wu, Yokohama (JP); Katsuyuki Tsuji, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 611 days.

(21) Appl. No.: 10/543,257

(22) PCT Filed: Feb. 2, 2004

(86) PCT No.: PCT/JP2004/001009

§ 371 (c)(1),
(2), (4) Date: Nov. 30, 2005

(87) PCT Pub. No.: WO2004/069746

PCT Pub. Date: Aug. 19, 2004

(65) Prior Publication Data

US 2006/0105903 A1    May 18, 2006

Related U.S. Application Data

(60) Provisional application No. 60/445,852, filed on Feb. 10, 2003.

(30) Foreign Application Priority Data

Feb. 3, 2003    (JP) .............................. 2003-026538

(51) Int. Cl.
*C01B 39/46* (2006.01)
*C01B 39/48* (2006.01)

(52) U.S. Cl. ..................... 423/718; 423/277; 423/702; 423/704; 423/705; 423/706

(58) Field of Classification Search ................. 423/702, 423/704, 705, 706, 718, 277
See application file for complete search history.

(56) References Cited

U.S. PATENT DOCUMENTS 6,231,751 B1 *  5/2001  Canos et al. ............ 208/120.01

(Continued)

FOREIGN PATENT DOCUMENTS

EP            0 293 032 A2     11/1988

OTHER PUBLICATIONS

Database WPI, Section Ch, Week 200272, abstracting CN 1355136, Jun. 6, 2002, XP002280174.
Jan-Olaf Barth, et al., "Synthesis of new MCM-36 derivatives pillared with alumina or magnesia-alumina", J. Mater. Chem., vol. 12, No. 2, 2002, pp. 369-373, XP002280173.

(Continued)

*Primary Examiner*—David M Brunsman
(74) *Attorney, Agent, or Firm*—Sughrue Mion, PLLC

(57) ABSTRACT

A modified layered metallosilicate material is produced by a process comprising the following first to fifth steps: (First Step) a step of heating a mixture containing a template compound, a boron compound, a silicon-containing compound and water to thereby obtain a precursor (A); (Second Step) a step of acid-treating the precursor (A) obtained in the first step, to thereby obtain a precursor (B); (Third Step) a step of heating the precursor (B) obtained in the second step in the presence of a swelling agent so as to swell the precursor (B) to thereby obtain a precursor (C); (Fourth Step) a step of modifying the manner of the stacking between layers in the precursor (C) obtained in the third step, to thereby obtain a precursor (D); and (Fifth Step) a step of calcining the precursor (D) obtained in the fourth step, to thereby obtain a modified layered metallosilicate material.

33 Claims, 4 Drawing Sheets

U.S. PATENT DOCUMENTS 7,323,154 B2 * 1/2008 Tatsumi et al. .............. 423/326
7,326,401 B2 * 2/2008 Tatsumi et al. .............. 423/713
2003/0004382 A1 * 1/2003 Van Den Brink et al. .... 585/467

OTHER PUBLICATIONS

A. Corma, et al., "Preparation, characterization and catalytic activity of ITQ-2, a delaminated zeolite", Microporous and Mesoporous Materials, vol. 38, No. 301, 2000, pp. 301-309, XP002280172.

* cited by examiner

MODIFIED LAYERED METALLOSILICATE MATERIAL AND PRODUCTION PROCESS THEREOF

This Application claims the priority of an application based on U.S. Provisional Application Ser. No. 60/445,852 (filed on Feb. 10, 2003). This application is a 371 of PCT/JP04/01009, filed Feb. 2, 2004.

TECHNICAL FIELD

The present invention relates to a process for producing a modified layered metallosilicate material, and a metallosilicate material which has been synthesized by such a process. In the present invention, the term "modified" means that the manner (or mode) of stacking between layers constituting a layered metallosilicate material is modified from a state where the planes of sheets as the unit constituting the respective layers are merely stacking in a plane-to-plane manner, into another state, e.g., where a plane and an edge are joined or connected with each other, or sheets are crosslinked with each other by another substance.

More specifically, the present invention relates to a process for modifying the manner of the stacking between layers of a crystalline layered material, which is a layered material as a precursor of a zeolite material having an MWW type structure, by using a post-synthesis method, and a modified crystalline layered metallosilicate material which has been produced by such a process.

BACKGROUND ART

In the natural world, there are known various materials having a stacked layer structure (in the present invention, such a material having a stacked layer structure is called "a layered material"), such as mica and graphite as representative examples.

Known examples of this layered material may include, e.g., various layered silicates. In particular, layered silicate clay minerals such as montmorillonite, beidellite, saponite, hectorite and fluorotetrasilicon mica are well known. In these silicate materials, a silica tetrahedron layer and an $Mg(OH)_2$ or $Al(OH)_3$ octahedron layer are connected to form a constituent unit. In the case of a clay mineral, this tetrahedron or octahedron layer is negatively charged by the isomorphous substitution of a low valence ion. The positive charge corresponding to this negative charge is held between layers by the cation having ion exchangeability.

It is long known that various polar molecules are taken in by intercalation between layers to greatly change the interlayer distance and by the modification of crosslinking of the layers of layered silicate with alumina or the like, the stability can be enhanced or a large amount of polar molecules of various types can be adsorbed therein.

On the other hand, a zeolite material called MCM-22 is recently attracting attention as a highly active aluminosilicate catalyst. As described in *Zeolite no Kagaku to Kogaku* (*Science and Engineering of Zeolite*) (Non-Patent Document 1), a patent application for a method of synthesizing this material was filed by Mobil in 1990 (JP-A (Japanese Unexamined Patent Publication; KOKAI)-63-297210, Patent Document 1) and thereafter, Leonowicz et al. reported that this is a hexagonal zeolite having a peculiar pore structure. A representative material thereof is borosilicate having the following unit cell composition:

$H_{2.4}Na_{3.1}[Al_{0.4}B_{5.1}Si_{66.5}O_{144}]$

The characteristic feature in the framework is to have two pore networks independent of each other in the direction perpendicular to the c axis (in the plane direction of layer). Among these pore networks, one is present between layers and a cocoon-like supercage (0.71×0.71×1.82 nm) is two-dimensionally connected to six supercages therearound. The supercages are directly connected to each other by a 10-membered ring and therefore, a relatively large molecule can enter into the pore as compared with a tunnel-like 10-membered ring pore. Another pore network is present within a layer and a two-dimensional network is formed by 10-membered ring zigzagged pores. ITQ-1 which is pure silica, SSZ-25 and the like have the same framework. IZA (International Zeolite Associate) recommends calling this structure by Structure Code MWW. Details on the structure are described, for example, in *Atlas*, 5th ed. or can be read on the internet, the homepage of IZA Structure Commission (http://www.iza-structure.org/) (as of January, 2003). The zeolite material having Structure Code MWW can be identified by its characteristic pattern of the X-ray diffraction (hereinafter simply referred to as "XRD"). As for the XRD pattern, for example, a simulation pattern of ITQ-1 can be available on the above-described homepage.

As a distinctive feature, this zeolite material is sometimes synthesized through a layered precursor (generally called MCM-22(P)). In the general production process therefor, the precursor can be obtained by a hydrothermal synthesis at 150° C. by using a relatively inexpensive hexamethylene-imine as the template. In the case of aluminosilicate, the precursor can be synthesized at an Si/Al molar ratio of 15 to 35. Unlike the production behavior of other zeolites, the material obtained by the hydrothermal synthesis is generally a layered precursor and when the precursor is calcined, dehydration condensation takes place between layers and MCM-22 having a zeolite structure is formed.

The MWW structure has a characteristic feature which has not seen in conventional zeolites as described above, and the aluminosilicate having the MWW structure is known to exhibit high activity and selectivity in the synthesis of ethylbenzene or cumene, as compared with those of zeolite having other structures or catalysts other than zeolite. Accordingly, it is considered that he aluminosilicate having the MWW structure is already used in many plants over the world.

Also, there is an attempt to obtain a catalyst having higher performance by utilizing the layered precursor which has been obtained in the synthesis of MWW structure. More specifically, MCM-36 obtained by crosslinking the layered precursor with silica (see, for example, W. J. Roth et al., *Stud. Surf. Sci. Catal.*, 94, 301 (1995), Non-Patent Document 2), thin layered zeolite ITQ-2 obtained by the delamination (see, for example, A. Corma et al., *Microporous Mesoporous Mater.*, 38, 301 (2000), Non-Patent Document 3) and the like have been reported and it is stated that these exhibit higher activity than aluminosilicate having a mere zeolitic MWW structure.

In the case of aluminosilicate, a process for producing a modified layered material having a structure analogous to MWW, other than the zeolite material (MWW structure) having a three-dimensional regular structure, by controlling the manner of the stacking between layers is established to a certain extent. This process is characterized in that, for example, MCM-22(P) as a layered aluminosilicate precursor is treated in an aqueous solution containing a surfactant such as hexadecyltrimethylammonium bromide to intercalate the surfactant between layers and thereby cause swelling and thereafter, the layers are crosslinked by silicate species to obtain a crosslinked layered material (MCM-36) or a layer is delaminated by ultrasonic wave irradiation or the like to form a so-called card house structure where the layers are joined with each other not only by plane-to-plane association but also by plane-to-edge association (ITQ-2). In either case, fundamentally, a process established for the modification of a layered silicate clay mineral is applied to MCM-22(P).

The MWW structure and the structure analogous thereto have a characteristic feature which has not seen in other zeolite structures as described above and therefore, a characteristic catalytic activity or adsorbing activity attributable to the structure can be expected. This characteristic activity is not necessarily limited to the above-described aluminosilicate but metallosilicate containing an element other than aluminum in the framework can be also expected to provide the same effect. From this expectation, various studies have been made on the synthesis of metallosilicate having an MWW structure or a structure analogous thereto. However, a transition element represented by titanium, vanadium and chromium, and a typical element of the 5th or greater period represented by indium and tin, which are expected to show remarkably different properties from aluminosilicate in general (not limited to MWW structure), have a very large ionic radius as compared with silicon or aluminum and therefore, such an element is difficult to introduce into the framework in many cases. Accordingly, a desired metallosilicate or a precursor thereof cannot be obtained in many cases by an easy and direct method of synthesizing, for example, allowing a compound containing such an element to be co-present in the raw material for the synthesis of zeolite.

For the purpose of introducing the element into the framework, various methods have been proposed. Representative examples of the method to be employed for the MWW structure may include a post-synthesis method (a method of once synthesizing zeolite and after-treating it to introduce a heteroelement into the framework; this is generally called a post-synthesis in contract with the direct synthesis) and an improved direct method.

With respect to the post-synthesis method, for example, U.S. Pat. No. 6,114,551 (Patent Document 2) discloses a process for synthesizing metallosilicate by a post-synthesis method, where aluminosilicate having an MWW structure is once synthesized, the whole or a part of aluminum is removed out of the system by a dealuminating treatment such as contact with $SiCl_4$ in gas phase to form defects in the aluminosilicate, and a compound containing an element to be introduced thereinto, such as $TiCl_4$, is contacted with the dealuminated product.

As for the improved direct method, Wu et al. have reported a method where ferrisilicate is obtained by designing the step of adding an iron compound to a gel (see, P. Wu et al., *Chem. Commun.*, 663 (1997), Non-Patent Document 4).

Furthermore, for Ti which is difficult to introduce into the framework, a synthesis method using boron as a structure supporting agent has been recently developed (see, P. Wu et al., *Chemistry Letters*, 774 (2000), Non-Patent Document 5).

Also, a process for obtaining MWW-type titanosilicate has been proposed, where a large amount of boron is added to a starting raw material, an MWW precursor MCM-22(P) having both boron and titanium in the framework is synthesized by utilizing the function of boron as a structure supporting agent and after, if desired, removing boron by an acid treatment, the obtained precursor is calcined. The titanosilicate having an MWW structure prepared by this method is reported to exert a characteristic catalytic activity (see, P. Wu et al., *J. Phys. Chem. B*, 105, 2897 (2001), Non-Patent Document 6).

However, according to these methods, many elements which have been intended to be introduced thereinto cannot actually be introduced into the framework but remain as a residue in the pore. In the conventional post-synthesis methods of introducing a metal into zeolite, one important point for elevating the introduction efficiency is to select a compound which can easily enter the pores of zeolite. However, this can encounter a problem in some cases, for example, when a compound containing an element intended to be introduced and having a sufficiently small molecular size is not commercially available.

Furthermore, when the resultant product is used as a catalyst or the like, in a case where the raw material is a dealuminated MWW-type aluminosilicate as in U.S. Pat. No. 6,114, 551 (Patent Document 2), a side reaction attributable to the aluminum remaining in the framework sometimes brings about a serious problem. The same problem occurs in the direct method using boron as a structure supporting agent. That is, boron cannot be satisfactorily removed even by an acid treatment and a large amount of boron remains in the framework or pores, or if strict conditions are set for the process of removing boron by an acid treatment or the like so as to enhance the efficiency of boron removal, elements which should remain in the framework are also disadvantageously removed at the same time. Moreover, the proper synthesis conditions are greatly affected by the element intended to be introduced and the compound containing the element and therefore, these methods are not good in view of the general-purpose applicability.

With respect to the process for producing metallosilicate having an MWW-analogous structure and not having a three-dimensional regular zeolite structure, where a transition element represented by titanium, vanadium chromium and iron or a typical element of the 5th or greater period represented by indium and tin is introduced into the framework, there has been reported by Corma et al. (see, *Chem. Commun.*, 779-780 (1999), Non-Patent Document 7) a method of grafting a titanocene compound ($TiCp_2Cl_2$) to silica-type ITQ-2 which has bee prepared by the delamination and then calcining the resultant product.

However, the production process for silica-type ITQ-2 is not described in detail and the possibility of Al remaining cannot be denied. Furthermore, a decrease in the selectivity is described when Ti content is increased. Thus, this is not necessarily effective as a process for effectively introducing a metal such as titanium into the framework.

[Patent Document 1]
JP-A-63-297210
[Patent Document 2]
U.S. Pat. No. 6,114,551
[Non-Patent Document 1]
*Zeolite no Kagaku to Kogyo* (*Science and Engineering of Zeolite*), Kodansha, Jul. 10, 2000
[Non-Patent Document 2]
W. J. Roth et al., *Stud. Surf. Sci. Catal.*, 94, 301 (1995)
[Non-Patent Document 3]
A. Corma et al., *Microporous Mesoporous Mater.*, 38, 301 (2000)
[Non-Patent Document 4]
P. Wu et al., *Chem. Commun.*, 663 (1997)
[Non-Patent Document 5]
P. Wu et al., *Chemistry Letters*, 774 (2000)
[Non-Patent Document 6]
P. Wu et al., *J. Phys. Chem. B*, 105, 2897 (2001)
[Non-Patent Document 7]
*Chem. Commun.*, 779-780 (1999)

DISCLOSURE OF INVENTION

An object of the present invention is to provide a process for simply and easily producing a modified layered material having an MWW-analogous structure, particularly, a modified layered material where an element having a large ionic radius and difficult to introduce by ordinary synthesis methods is contained in the framework at a high ratio, and to provide the modified layered material.

As a result of earnest study, the present inventors have found that a modified layered material having a structure analogous to Structure Code MWW and containing an element having a large ionic radius in the framework at a high ratio can be simply and easily synthesized by a specific production process. The present invention has been accomplished based on this discovery.

More specifically, the present invention (I) is a process for producing a crystalline metallosilicate material modified in the form, comprising the following first to fifth steps:

First Step:
   a step of heating a mixture containing a template compound, a boron compound, a silicon-containing compound and water to thereby obtain a precursor (A);

Second Step:
   a step of acid-treating the precursor (A) obtained in the first step, to thereby obtain a precursor (B);

Third Step:
   a step of heating the precursor (B) obtained in the second step in the presence of a swelling agent so as to swell the precursor (B) to thereby obtain a precursor (C);

Fourth Step:
   a step of modifying the manner of the stacking between layers in the precursor (C) obtained in the third step, to thereby obtain a precursor (D); and Fifth Step:
   a step of calcining the precursor (D) obtained in the fourth step, to thereby obtain a modified layered metallosilicate material.

The present invention (II) is a crystalline layered metallosilicate material having an MWW-analogous structure and modified in the manner of the stacking between layers. This modified layered material can be effectively produced by the process of the present invention (I).

The present invention comprises, for example, the following matters.

[1] A process for producing a modified layered metallosilicate material, comprising the following first to fifth steps:

First Step:
   a step of heating a mixture containing a template compound, a boron compound, a silicon-containing compound and water to thereby obtain a precursor (A);

Second Step:
   a step of acid-treating the precursor (A) obtained in the first step, to thereby obtain a precursor (B);

Third Step:
   a step of heating the precursor (B) obtained in the second step in the presence of a swelling agent so as to swell the precursor (B) to thereby obtain a precursor (C);

Fourth Step:
   a step of modifying the manner of the stacking between layers in the precursor (C) obtained in the third step, to thereby obtain a precursor (D); and Fifth Step:
   a step of calcining the precursor (D) obtained in the fourth step, to thereby obtain a modified layered metallosilicate material.

[2] The process for producing a modified layered metallosilicate material according to [1], wherein the following first-2 step is performed between the first step and the second step and the precursor (A') obtained in the first-2 step is used as the precursor (A) in the second step:

First-2 Step:
   a step of calcining a part or the whole of the precursor (A) obtained in the first step.

[3] The process for producing a modified layered metallosilicate material according to [1] or [2], wherein the swelling agent is a surfactant.

[4] The process for producing a modified layered metallosilicate material according to any one of [1] to [3], wherein the pH at the time of the contact with the swelling agent in the third step is from 10 to 14.

[5] The process for producing a modified layered metallosilicate material according to [4], wherein the pH at the time of the contact with the swelling agent in the third step is from 11 to 12.5.

[6] The process for producing a modified layered metallosilicate material according to any one of [1] to [5], wherein the temperature at the contact with the swelling agent in the third step is from 50 to 180° C.

[7] The process for producing a modified layered metallosilicate material according to any one of [1] to [6], wherein the following second-2 step is performed between the second step and the third step and the precursor (B') obtained in the second-2 step is used as the precursor (B) in the third step:

Second-2 Step:
   a step of heating the precursor (B) obtained in the second step together with the template compound, water and a compound containing at least one element selected from the elements belonging to Groups 3 to 14 of the periodic table to thereby obtain a precursor (B').

[8] The process for producing a modified layered metallosilicate material according to [7], wherein the following second-3 step is performed between the second-2 step and the third step and the precursor (B") obtained in the second-3 step is used as the precursor (B) in the third step:

Second-3 Step:
   a step of acid-treating the precursor (B') obtained in the second-2 step, to thereby obtain a precursor (B").

[9] The process for producing a modified layered metallosilicate material according to any one of [1] to [6], wherein in the third step, a compound containing at least one element selected from the elements belonging to Groups 3 to 14 of the periodic table is co-present with the precursor which has been acid-treated in the second step.

[10] The process for producing a modified layered metallosilicate material according to [9], wherein in the third step, an amine is co-present.

[11] The process for producing a modified layered metallosilicate material according to any one of [1] to [10], wherein the fourth step is the following fourth (a) step:

Fourth (a) Step:
   a step of delaminating at least a part of the swollen precursor (C) obtained in the third step.

[12] The process for producing a modified layered metallosilicate material according to [11], wherein in the fourth (a) step, the delamination is performed by the stirring and/or ultrasonic irradiation.

[13] The process for producing a modified layered metallosilicate material according to any one of [1] to [10], wherein the fourth step is the following fourth (b) step:

Fourth (b) Step:
a step of interlayer crosslinking a part or the whole of the swollen precursor (C) obtained in the third step.

[14] The process for producing a modified layered metallosilicate material according to [13], wherein the crosslinking agent is a silicon-containing compound.

[15] The process for producing a modified layered metallosilicate material according to any one of [1] to [14], wherein the following fourth-2 step is performed between the fourth step and the fifth step and the precursor (D') obtained in the fourth-2 step is used as the precursor (D) in the fifth step:

Fourth-2 Step:
a step of acid-treating the precursor (D) obtained in the fourth step, to thereby obtain a precursor (D').

[16] The process for producing a modified layered metallosilicate material according to any one of [1] to [15], wherein the template compound is a nitrogen-containing compound.

[17] The process for producing a modified layered metallosilicate material according to [16], wherein the nitrogen-containing compound is an amine or a quaternary ammonium compound.

[18] The process for producing a modified layered metallosilicate material according to [16], wherein the nitrogen-containing compound is at least one or more member selected from the group consisting of piperidine, hexamethyleneimine and a mixture of piperidine and hexamethyleneimine.

[19] The process for producing a modified layered metallosilicate material according to any one of [1] to [18], wherein the boron-containing compound is at least one or more member selected from the group consisting of boric acid, borates, boron oxides, boron halides and trialkylborons.

[20] The process for producing a modified layered metallosilicate material according to any one of [1] to [19], wherein the silicon-containing compound is at least one or more member selected from the group consisting of silicic acid, silicates, silicon oxides, silicon halides, fumed silicas, tetraalkyl orthosilicates and colloidal silicas.

[21] The process for producing a modified layered metallosilicate material according to any one of [1] to [20], wherein the ratio of boron and silicon in the mixture of the first step is, in terms of the molar ratio, boron:silicon=0.01 to 10:1.

[22] The process for producing a modified layered metallosilicate material according to any one of [1] to [21], wherein the ratio of water and silicon in the mixture of the first step is, in terms of the molar ratio, water:silicon=5 to 200:1.

[23] The process for producing a modified layered metallosilicate material according to any one of [1] to [22], wherein the ratio of template compound and silicon in the mixture of the first step is, in terms of the molar ratio, template compound:silicon=0.1 to 5:1.

[24] The process for producing a modified layered metallosilicate material according to any one of [1] to [23], wherein the heating temperature in the first step is from 110 to 200° C.

[25] The process for producing a modified layered metallosilicate material according to any one of [1] to [24], wherein the acid used for the acid-treatment in the second step is nitric acid.

[26] The process for producing a modified layered metallosilicate material according to any one of [7] to [25], wherein the heating temperature in the second-2 step is from 110 to 200° C.

[27] The process for producing a modified layered metallosilicate material according to any one of [1] to [26], wherein the calcining temperature in the fifth step is from 200 to 700° C.

[28] The process for producing a modified layered metallosilicate material according to any one of [2] to [27], wherein the calcining temperature in the first-2 step is from 200 to 700° C.

[29] The process for producing a modified layered metallosilicate material according to any one of [7] to [28], wherein in the second-2 step, the precursor (B) acid-treated in the second step and a mixture containing a template compound and water are charged by isolating these from each other and a dry gel method of bringing a vapor of the mixture containing a template compound and water into contact with a mixture of the precursor (B) and a compound containing at least one element selected from the elements belonging to Groups 3 to 14 of the periodic table is used.

[30] The process for producing a modified layered metallosilicate material according to any one of [7] to [29], wherein at least one element selected from the elements belonging to Groups 3 to 14 of the periodic table used in the second-2 step is at least one element selected from the group consisting of titanium, zirconium, vanadium, niobium, tantalum, chromium, molybdenum, tungsten, manganese, iron, cobalt, nickel, zinc, gallium, indium, tin and lead.

[31] A modified layered metallosilicate material characterized by the powder X-ray diffraction line shown in Table 1 and having a nitrogen adsorption amount of 0.5 cm$^3$/g or more under a relative pressure of 0.95 as measured at a liquid nitrogen temperature.

TABLE 1

Powder X-Ray Diffraction Lines Given by Modified Layered Material Having MWW-analogous Structure

| d/Å | Relative Intensity |
|---|---|
| 12.2 ± 1 | w |
| 10.9 ± 0.6 | m |
| 8.7 ± 0.5 | m |
| 6.8 ± 0.4 | m |
| 6.1 ± 0.4 | w |
| 5.4 ± 0.3 | w |
| 3.9 ± 0.2 | w |
| 3.4 ± 0.2 | w |

[32] The modified layered metallosilicate material according to [31], which comprises at least one element selected from the group consisting of titanium, zirconium, vanadium, niobium, tantalum, chromium, molybdenum, tungsten, manganese, iron, cobalt, nickel, zinc, gallium, indium, tin and lead.

[33] The modified layered metallosilicate material according to [31] or [32], which is synthesized by the production process described in any one of [1] to [30].

BEST MODE FOR CARRYING OUT THE INVENTION

Figure 1:
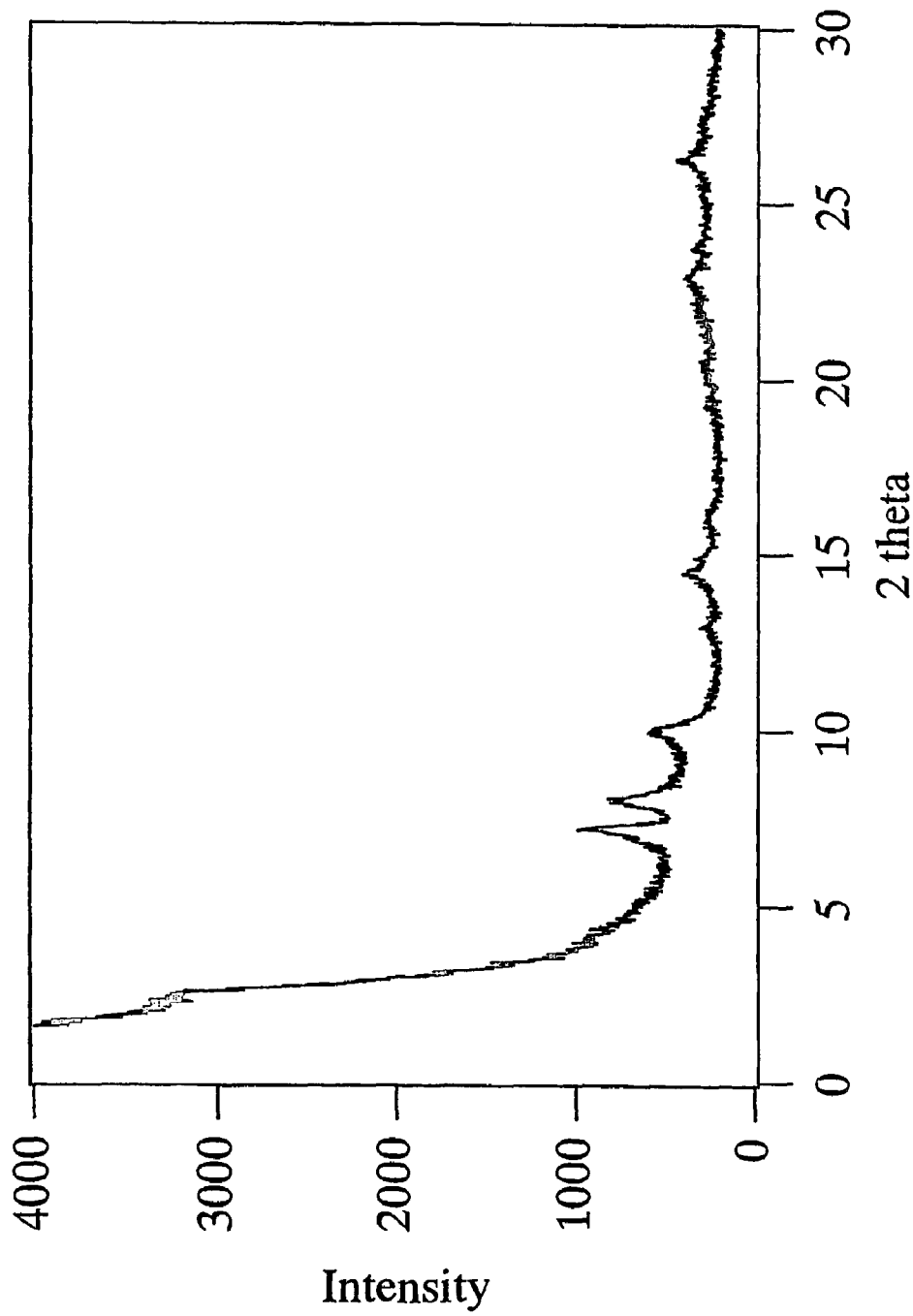
FIG. 1 is a powder X-ray diffraction pattern of the modified layered material which has been obtained in Example 1.

Hereinbelow, the present invention will be described in detail with reference to the accompanying drawings as desired. In the following description, "%" and "part(s)" representing a quantitative proportion or ratio are those based on mass, unless otherwise specifically noted (Present Invention (I))

The present invention (I) is described below. The present invention (I) is a process for producing a modified layered material having an MWW-analogous structure, comprising the following first to fifth steps (the general method and mechanism of the interlayer crosslinking of a clay porous material is described, for example, in Takeuchi, *Takoshitsu Tai no Seishitsu to Sono Oyo* (*Properties and Application of Porous Materials*), pp. 111-121, Fuji Techno-System (1999)):

First Step:
  a step of heating a mixture containing a template compound, a boron compound, a silicon-containing compound and water to thereby obtain a boron-containing layered silicate precursor (A);

Second Step:
  a step of acid-treating the precursor (A) obtained in the first step, to thereby obtain a precursor (B);

Third Step:
  a step of heating the precursor (B) obtained in the second step in the presence of a swelling agent so as to swell the precursor (B), to thereby obtain a precursor (C);

Fourth Step:
  a step of modifying the manner of the stacking between layers in the precursor (C) obtained in the third step, to thereby obtain a precursor (D); and Fifth Step:
  a step of calcining the precursor (D) obtained in the fourth step, to thereby obtain a modified layered metallosilicate material.

The layered material having an MWW-analogous structure can be synthesized, as described above, by delaminating MCM-22(P) which is a layered precursor of an MWW zeolite material, and then contacting it with a compound containing an element such as titanocene.

However, the layered material having an MWW-analogous structure of the present invention can be efficiently produced by the production process of the present invention (I). More specifically, the production process for a layered material having an MWW-analogous structure of the present invention is a process for producing a modified layered material having an MWW-analogous structure, comprising five steps, that is, a step of heating a mixture containing a template compound, a boron-containing compound, a silicon-containing compound and water to thereby obtain a precursor (A), a step of acid-treating the obtained precursor (A), a step of heating the resulting acid-treated precursor (B) in the presence of a swelling agent to thereby obtain a swollen precursor (C), a step of treating the swollen precursor (C) to modify the manner of the stacking between layers, and a step of calcining the obtained precursor (D).

(First Step)

The first step is described below. In the production process for a modified layered material having an MWW-analogous structure of the present invention (I), the first step is a step of heating a mixture containing a template compound, a boron-containing compound, a silicon-containing compound and water to thereby obtain a precursor (A).

The "template compound" as used herein means a compound having an activity of regulating the structure or pore shape at the time of synthesizing the layered precursor having an MWW-analogous structure. The template compound is not particularly limited as long as it can be removed later by calcination. Examples of the template compound which is generally used may include nitrogen-containing compounds. Among these, amines and/or quaternary ammonium compounds are preferred. Specific examples of the amine may include, but are not limited to, piperidine, hexamethyleneimine and/or a mixture of piperidine and hexamethyleneimine.

The boron-containing compound which can be used in the first step is not particularly limited. Boric acid is preferred from the standpoint of not introducing a metal compound other than boron but a borate such as sodium borate may also be used.

The silicon-containing compound which can be used in the first step is not particularly limited and specific examples thereof may include silicic acid, silicates, silicon oxides, silicon halides, fumed silicas, tetraalkyl orthosilicates and colloidal silicas. In any case, those having a high purity (for example, those where the percentage of silicon in all metal components contained is 98% or more) are preferred. Particularly, in the case of colloidal silica, those having a smaller alkali content (for example, those having an alkali content of, in terms of the alkali/silicon ratio, 0.01 or less) are more preferred.

The ratio between boron and silicon in the mixture of the first step may preferably be, in terms of the molar ratio, boron:silicon=0.01 to 10:1, more preferably boron:silicon=0.05 to 5:1, still more preferably boron:silicon=0.3 to 3:1, because the synthesis of precursor is facilitated. At the synthesis of precursor under the alkali metal-free condition, it is very preferred to use a large amount of boron as described later, and the ratio may preferably be boron silicon=0.3 to 2:1, more preferably boron:silicon=1 to 2:1.

The ratio between water and silicon in the mixture of the first step may preferably be, in terms of the molar ratio, water:silicon=5 to 200:1, more preferably water:silicon=15 to 50:1, because if the ratio is too small, a good mixture cannot be obtained, whereas if too large, low productivity results.

The ratio between the template compound and silicon in the mixture of the first step may preferably be, in terms of the molar ratio, template compound:silicon=0.1 to 5:1, more preferably template compound:silicon=0.3 to 3:1, still more preferably template compound:silicon=0.5 to 2:1, because if the ratio is too small, the objective material cannot be obtained, whereas if too large, the template compound is wasted and this is unprofitable.

In addition to these raw materials, it is sometimes useful to add a seed crystal (seed). This provides an effect such as shortening of crystallization time or formation of a product having a small particle size. The seed may preferably be a previously synthesized material having an MWW structure or a material having an MWW-analogous structure, such as MCM-22(P) which is a layered precursor, more preferably a boron-containing layered precursor of an MWW zeolite material. For example, a part of the precursor (A) obtained in the first step of synthesis performed in the past may be added as a seed to the mixture for use in the first step. The timing of adding the seed is not particularly limited. For example, the seed may be added after all other raw materials are mixed, and the mixture may be further stirred and then heated. The amount of the seed added is, in terms of the molar ratio of silicon contained in the seed to silicon in the silicon-containing compound used as a main raw material, preferably seed crystal:main raw material=0.0001 to 0.2:1, more preferably 0.001 to 0.05:1.

A compound containing an alkali metal such as sodium or potassium may also be added and by this addition, the crystallization time can be shortened in some cases. In general, the presence of an alkali metal has a tendency of inhibiting an element other than boron, aluminum and silicon from entering into the framework of zeolite material, or accelerating the condensation of the compound itself containing an element intended to be introduced into the framework. For example, it is well known that in the synthesis of titanosilicate such as TS-1, when an alkali metal is present in the system, titanium cannot be successfully introduced into the zeolite framework and the titanium source added is integrated as titania or analogous titania species into the product. However, in the present invention, even when an alkali metal is used in the first step, the alkali metal can be substantially removed by the acid treatment (second step) before the step of introducing a metal species into the framework (second-2 step or third step). Therefore, an alkali metal can be used in the first step of the present invention and the alkali metal may be present in an amount, in terms of the molar ratio to silicon, on the order of alkali metal:silicon=0.0001 to 0.2:1, preferably 0.001 to 0.1: 1. Examples of the alkali metal source may include hydroxides, nitrates, chlorides, sulfates and other metal acid salts. The alkali metal source is most preferably a hydroxide or a borate.

The heating temperature in the first step is not particularly limited but in the case of synthesizing the precursor (A), the heating may preferably be performed under hydrothermal reaction conditions. The term "hydrothermal reaction" as used herein means, as described in "Hydrothermal Reaction" of *Hyojun Kagaku Yogo Jiten* (*Standard Chemical Glossary*), compiled by Nippon Kagaku Kai, Maruzen (Mar. 30, 1991), a synthesis or modification reaction of a substance performed in the presence of high-temperature water, particularly high-temperature high-pressure water. In particular, a synthesis reaction using the hydrothermal reaction is called a "hydrothermal synthesis". Accordingly, the heating in the first step may preferably be performed by placing a mixture containing a template compound, a boron-containing compound, a silicon-containing compound and water in a closed container such as autoclave and heating it under hydrothermal synthesis conditions of applying a pressure while heating. The temperature may preferably be from 110 to 200° C., more preferably from 120 to 190° C.

If the temperature at the hydrothermal synthesis is less than this range, the objective product may not be obtained or even if obtained, the heating may take a long time and this is not practical. On the other hand, if the temperature exceeds this range, the yield of the objective product in the oxidation reaction using the finally obtained zeolite material disadvantageously decreases.

The hydrothermal synthesis time is usually from 2 hours to 30 days, preferably from 3 hours to 10 days. If the hydrothermal synthesis time is less than this range, crystallization may proceed insufficiently to fail in obtaining a high-performance precursor (A). On the other hand, even if the hydrothermal synthesis is performed for a time period exceeding this range, the performance of the precursor (A) is not substantially enhanced but rather adverse effects may be caused such as conversion into other phases or increase of the particle size and this it not preferred.

(Second Step)

The second step is described below. The second step is a step of acid-treating the precursor (A) or (A') obtained in the first step or first-2 step, to thereby obtain a deboronated silicate (precursor (B)).

The precursor (A) obtained in the first step may be acid-treated as it is but when the precursor is calcined (first-2 step) before the acid treatment and thereafter acid-treated, boron inside the framework can be more efficiently removed and this is preferred.

In the following, "precursor (A)" and "precursor (A')" are sometimes collectively called "precursor (A)".

The term "acid treatment" as used herein means to contact the precursor with an acid, more specifically, to bring the precursor (A) obtained in the first step into contact with a solution containing an acid or with an acid itself. The contacting method is not particularly limited and a method of spraying or coating an acid or an acid solution on the precursor (A) or a method of dipping the precursor (A) in an acid or an acid solution may be used. The method of dipping the precursor (A) in an acid or an acid solution is preferred, because this method is simple and easy.

The acid used for the contact with an acid may be an inorganic acid, an organic acid or a salt thereof. Specific preferred examples of the inorganic acid may include a hydrochloric acid, a sulfuric acid, a nitric acid and a phosphoric acid. Specific preferred examples of the organic acid may include a formic acid, an acetic acid, a propionic acid and a tartaric acid. Examples of the salt thereof may include a sodium salt, a potassium salt, a calcium salt, a magnesium salt and an ammonium salt.

In the case of using the acid as a solution, the solvent therefor is not particularly limited. Specific examples of the solvent may include water, alcohols, ethers, esters and ketones. Among these, water is preferred in view of stability in the presence of an acid or easy availability.

The acid concentration is also not particularly limited but the acid is suitably used in a concentration of 0.1 to 10 mol/liter. The treatment may be performed at a temperature of 0 to 200° C. but may preferably be performed at 50 to 180° C., more preferably from 60 to 150° C. The treatment time is from 0.1 hour to 3 days, preferably from 2 hours to 1 day.

If the acid concentration is low and the temperature is low, the efficiency in the removal of boron is low, whereas if the acid concentration is high and the temperature is high, the precursor itself may be dissolved.

In order to reduce the amount of remaining boron, the cycle of (first-2 step→second step) may be performed two or more times before the third step.

(Third Step)

The third step is described below. The third step is a step of heating the deboronated silicate obtained in the second step, second-2 step or second-3 step in the presence of a swelling agent so as to swell the precursor (B) to obtain a precursor (C).

The metal can be introduced into the layered material by either a method of allowing a metal-containing compound to coexist in the third step and introducing the metal in the same process as the swelling of the layered material or a method of subjecting a layered precursor passed through a metal-introducing step to the third step.

In the case of introducing a metal into the layered material by the latter method, the following second-2 step must be performed before the third step. If desired, the second-3 step may also be performed following the second-2 step.

Second-2 Step:

A step of heating the acid-treated precursor (B) obtained in the second step together with a template compound, water and a compound containing at least one element selected from the elements belonging to Groups 3 to 14 of the periodic table to thereby obtain a precursor (B').

Second-3 Step:

A step of acid-treating the precursor (B') obtained in the second-2 step, to thereby obtain a precursor (B").

In the following, "precursor (B)", "precursor (B')" and "precursor (B")" are sometimes collectively called "precursor (B)".

The precursor (B') obtained in the second-2 step can be synthesized by previously mixing all of the acid-treated precursor (B) obtained in the second step, a template compound and an element-containing compound, heating the resulting mixture and performing a so-called hydrothermal synthesis in the same manner as in the first step.

As for the order of mixing, from the standpoint of homogenizing the raw material composition, it is preferred to prepare a mixed solution comprising water, a template compound and an element-containing compound and add thereto the precursor (B) obtained in the second step. The mixed solution comprising water, a template compound and an element-containing compound may preferably be a homogeneously dissolved solution but not a slurry. For achieving this, the kind of the element-containing compound, the mixing ratio, the mixing conditions (e.g., temperature, time) and the like may preferably be devised.

In the mixture of the second-2 step, the ratio of the element and silicon in the precursor (B) may preferably be, in terms of the molar ratio, element:silicon=0.001 to 0.3:1, more preferably element:silicon=0.005 to 0.2:1, still more preferably element:silicon=0.01 to 0.2:1.

In the second-2 step, the ratio of water and silicon in the precursor (B) may preferably be, in terms of the molar ratio, water:silicon=5 to 200:1, more preferably water:silicon=15 to 50:1.

In the second-2 step, the ratio of the template compound and silicon in the precursor (B) may preferably be, in terms of the molar ratio, template compound:silicon=0.1 to 5:1, more preferably template compound:silicon=0.3 to 3:1, still more preferably template compound:silicon=0.5 to 2.

As for the conditions of hydrothermal synthesis in the second-2 step, the same conditions as described for the first step may be applied. However, in a case where a compound containing an element of Groups 3 to 14 is co-present in the second-2 step, the proper synthesis conditions sometimes greatly differ from those in the first step. Particularly, the temperature and time may preferably be selected according to the element to be present together, so as to give the objective precursor (B') in a high purity. If the temperature is too high or the time is too long, not the objective precursor (B') but a material having other structure, such as ZSM-39 (Structure Code MTN), may be produced.

In another mode for carrying out the second-2 step, a mixture (mixture A) of the acid-treated precursor (B) obtained in the second step and an element-containing compound and a mixture (mixture B) of water and a template compound may be charged by isolating these mixtures from each other and a dry gel method of bringing a mixture (mixture A) of the acid-treated precursor (B) obtained in the second step and a metal-containing compound into contact with a vapor of water and the template compound may be used. This is advantageous, for example, in that the template compound not consumed for the crystallization can be easily recovered (this "dry gel method" is described in detail, for example, in *Zeolite no Kagaku to Kogaku* (*Science and Engineering of Zeolite*), supra, page 28).

The mixture A is obtained by dispersing a solution of the element-containing compound uniformly as much as possible in the acid-treated precursor (B) obtained in the second step, by impregnation, dipping or the like, drying the resulting dispersion and, if desired, grinding it. The drying can be performed by various methods such as air drying at room temperature or vacuum drying at a high temperature. In general, an aqueous solution is used in many cases and therefore, the drying may be performed by the heating at a temperature of 50 to 80° C. for 1 to 24 hours. When the grinding becomes possible, this may be set as the end point of drying. The mixture B can be obtained by mixing the template compound and water.

The kind of the template compound used in the dry gel method, the kind of the element-containing compound capable of coexisting, the ratio of the coexisting element and silicon in the precursor (B), and the ratio of the template compound and silicon in the precursor (B) may be the same as those described above for the normal hydrothermal synthesis method.

The ratio of water and silicon in the precursor (B) differs in the proper range from that in the normal hydrothermal synthesis method. This ratio is, in terms of the molar ratio, preferably water:silicon=0.01 to 15:1, more preferably water:silicon=0.1 to 10:1.

For isolating the mixture A and the mixture B, any method may be used as long as these mixtures are not mixed unless the mixture B is vaporized by elevating the temperature. For example, a method of charging the mixture B into the bottom of an autoclave and hanging a vessel containing the mixture A in the middle of the autoclave may be used.

As for the conditions of the hydrothermal synthesis in the second-2 step, the same conditions as described above with respect to the first step can be applied.

The acid treatment in the second-3 step can also be performed according to the method in the second step.

The compound containing at least one element selected from the elements belonging to Groups 3 to 13, which can be used in the third step or the second-2 step, is not particularly limited as long as it is a compound containing as a metal at least one element selected from the elements belong to Groups 3 to 14. In particular, from the standpoint that the introduction is difficult by conventional methods but can be performed with good efficiency by the method of the present invention, the compound may be sufficient if it contains at least one element selected from the group consisting of titanium, zirconium, vanadium, niobium, tantalum, chromium, molybdenum, tungsten, manganese, iron, cobalt, nickel, zinc, gallium, indium, tin and lead. More specifically, examples of the titanium-containing compound may include, but are not limited to, titanium oxides, titanium halides and tetraalkyl orthotitanates. In view of easy handleability, titanium halides and tetraalkyl orthotitanates are preferred. Specific examples of the titanium-containing compound which can be suitably used may include titanium tetrafluoride, tetraethyl orthotitanate, tetrapropyl orthotitanate and tetrabutyl orthotitanate. In addition, titanium peroxides obtained by the reaction of a tetraalkyl orthotitanate and aqueous hydrogen peroxide are also preferred.

Examples of the zirconium-containing compound may include, but are not limited to, zirconium oxides, zirconium halides and zirconium tetraalkoxides. In view of easy handleability, zirconium halides and zirconium tetraalkoxides are preferred. Specific examples of the zirconium-containing compound which can be suitably used may include zirconium tetrafluoride, zirconium tetraethoxide and zirconium tetrabutoxide.

Examples of the vanadium-containing compound may include, but are not limited to, vanadium oxides, vanadium halides and vanadium oxide trialkoxides. In view of easy handleability, vanadium halides and vanadium oxide trialkoxides are preferred. Specific examples of the vanadium-containing compound which can be suitably used may include vanadium trichloride and vanadium oxide triisopropyloxide.

Examples of the niobium-containing compound may include, but are not limited to, niobium oxides, niobium halides and niobium tetraalkanoates. In view of easy handleability, niobium tetraalkanoates are preferred. Specific examples of the niobium-containing compound which can be suitably used may include niobium tetrakis(2-ethylhexanoate).

Examples of the tantalum-containing compound may include, but are not limited to, tantalum oxides, tantalum halides and tantalum disulfides. Specific examples of the tantalum-containing compound which can be suitably used may include tantalum disulfide.

Examples of the chromium-containing compound may include, but are not limited to, chromium acetates, chromium nitrates and chromium halides. Specific examples of the chromium-containing compound which can be suitably used may include chromium nitrate.

Examples of the molybdenum-containing compound may include, but are not limited to, molybdenum oxides, molybdenum halides and molybdenum sulfides. Specific examples of the molybdenum-containing compound which can be suitably used may include molybdenum trichloride.

Examples of the tungsten-containing compound may include, but are not limited to, tungsten oxides and tungsten halides. Specific examples of the tungsten-containing compound which can be suitably used may include tungsten tetrachloride.

Examples of the manganese-containing compound may include, but are not limited to, manganese oxides, manganese halides, manganese acetates and manganese acetylacetonates. Specific examples of the manganese-containing compound which can be suitably used may include manganese trisacetylacetonate.

Examples of the iron-containing compound may include, but are not limited to, iron oxides, iron halides, iron acetates and iron nitrates. Specific examples of the iron-containing compound which can be suitably used may include iron nitrate.

Examples of the cobalt-containing compound may include, but are not limited to, cobalt oxides, cobalt halides and cobalt trisacetylacetonates. Specific examples of the cobalt-containing compound which can be suitably used may include cobalt trisacetylacetonate.

Examples of the nickel-containing compound may include, but are not limited to, nickel oxides, nickel halides, nickel nitrates and nickel acetates. Specific examples of the nickel-containing compound which can be suitably used may include nickel nitrate and nickel acetate.

Examples of the zinc-containing compound may include, but are not limited to, zinc oxides, zinc halides, zinc acetates and zinc nitrates. Specific examples of the zinc-containing compound which can be suitably used may include zinc acetate and zinc nitrate.

Examples of the gallium-containing compound may include, but are not limited to, gallium oxides, gallium halides and gallium nitrates. Specific examples of the gallium-containing compound which can be suitably used may include gallium trichloride and gallium trifluoride.

Examples of the indium-containing compound may include, but are not limited to, indium oxides, indium halides and trialkoxy indiums. Specific examples of the indium-containing compound which can be suitably used may include indium trichloride, indium trifluoride and triisopropyloxy indium.

Examples of the tin-containing compound may include, but are not limited to, tin oxides, tin halides and tetraalkoxy tins. Specific examples of the tin-containing compound which can be suitably used may include tin tetrachloride, tin tetrafluoride and tetra-tert-butoxytin.

Examples of the lead-containing compound may include, but are not limited to, lead oxides, lead halides and tetraalkoxy leads. Specific examples of the lead-containing compound which can be suitably used may include lead acetate, lead chloride, lead nitrate, lead acetylacetonate and lead sulfate.

(Swelling Agent)

The "swelling agent" used in the third step is not particularly limited as long as it has an activity of intruding between layers in the precursor (B) of an MWW zeolite material, for example, by intercalation and expanding the interlayer spacing, thereby swelling the precursor, and can be removed later by calcination. Generally, in view of high swelling effect, examples of the swelling agent may include surfactants. A quaternary ammonium salt having at least one long alkyl group or an amine is preferred. In particular, a quaternary ammonium salt containing one long alkyl chain having from 8 to 20 carbon atoms, such as alkyltrimethylammonium salt and alkyltriethylammonium salt, or containing two long alkyl chains, such as dialkyldimethylammonium salt and dialikyldiethylammonium salt, is used. Also, a primary or secondary amine compound containing at least one long alkyl chain having from 8 to 20 carbon atoms may be used and a mixture thereof is suitably used. The quaternary ammonium salt may be any of chloride, bromide, hydroxide and iodide but in the case of a halide, at least a part thereof may preferably be hydroxylated in the co-presence of aqueous ammonia or another quaternary ammonium salt such as tetramethylammonium hydroxide, tetraethylammonium hydroxide and tetrapropylammonium hydroxide. Particularly preferred examples of the swelling agent may include lauryltrimethylammonium chloride, lauryltrimethylammonium bromide, lauryltrimethylammonium hydroxide, cetyltrimethylammonium chloride, cetyltrimethylammonium bromide, cetyltrimethylammonium hydroxide, stearyltrimethylammonium chloride, stearyltrimethylammonium bromide, stearyltrimethylammonium hydroxide, distearyldimethylammonium chloride, distearyldimethylammonium bromide, distearyldimethylammonium hydroxide.

The temperature in the third step is not particularly limited but this is suitably from room temperature to 180° C. In a case where a compound containing at least one element selected from the elements of Groups 3 to 14 is made co-present and this metal is incorporated into the framework of the layered material in the third step, a relatively high temperature should be employed and the temperature is suitably from 50 to 150° C. However, if the temperature is too high, the precursor (B) dissolves in some cases, therefore, proper conditions such as relatively low pH may preferably be examined.

In the third step, at the incorporation of the metal into the framework of the layered material, the metal may preferably be accompanied by an amine. The amine may preferably be hexamethyleneimine, piperidine, which are also an effective template compound, a primary or secondary amine containing an alkyl group having from 8 to 20 carbon atoms or a mixture thereof.

The pH at the treatment in the third step is suitably from 10 to 14. The "pH at the treatment" as used herein means a pH measured at room temperature after the acid-treated precursor (B), a swelling agent and all other additives such as water and quaternary ammonium hydroxide are mixed. The pH may preferably be adjusted to the proper range by controlling the amount of swelling agent, the amount of precursor (B) treated, and the amount of quaternary ammonium hydroxide added. If the pH is too low, satisfactory swelling cannot be obtained, whereas if the pH is too high, the crystal structure of precursor (B) is destroyed and in an extreme case, the precursor may be dissolved out.

The treating time is also not particularly limited but this is suitably from 5 minutes to 2 days.

(Fourth Step)

The fourth step is described below. The fourth step is a step of modifying the manner of the stacking between layers by further treating the swollen precursor (C) obtained in the third step, to thereby obtain a precursor (D). The modification method may be selected from the following two methods, namely, the fourth (a) step and the fourth (b) step:

Fourth (a) Step:
a step of delaminating at least a part of the swollen precursor (C) obtained in the third step; and Fourth (b) Step:
a step of interlayer crosslinking the swollen precursor (C) obtained in the third step.

The fourth (a) step is a step of delaminating at least a part of the swollen precursor (C) obtained in the third step to form a card house structure. The delamination sometimes proceeds simultaneously with the process of contacting the precursor (B) with the swelling agent performed in the third step and in such a case, the treatment of the fourth step needs not to be newly performed and the third and fourth steps can be satisfied by the same process.

The delamination can be achieved by vigorously stirring the swollen precursor (B) or irradiating thereon ultrasonic waves. The irradiation of ultrasonic waves is suitably performed for 5 minutes to 2 hours by using, for example, an irradiator having an output of 50 W or more.

The slurry after delamination may be recovered as it is by filtration or centrifugal separation but may be separated and recovered from the treated solution after once lowering the pH to about 2 by adding an acid to facilitate the precipitation of solid.

In place of the fourth (a) step, the fourth (b) step of performing the interlayer crosslinking may also be employed.

(Interlayer Crosslinking)

The interlayer crosslinking can be performed by a known method but in the production of metallosilicate of the present invention, crosslinking with silica is preferred in many cases. For example, the interlayer crosslinking can be achieved by contacting the swollen precursor (C) with a silicate raw material such as tetraethyl orthosilicate or TMA-silicate comprising silica sol and tetremethylammonium salt.

(Fifth Step)

The fifth step is described below. The fifth step is a step of calcining the precursor (D) or (D') obtained in the fourth step or the fourth-2 step, to thereby obtain a modified layered material.

In the following, "precursor (D)" and "precursor (D')" are sometimes collectively called "precursor (D)".

The process for the calcination of precursor (D) performed in the fifth step is not particularly limited and the calcination can be performed under known conditions such as normal catalyst calcination. The calcination may be performed either in a closed system or in a flow system and it may suffice if an oxygen necessary for the burning of the template compound or a residue thereof is present at the necessary time. Calcination in an air stream is easiest but for the purpose of avoiding excessive heat generation, it is also possible to decompose the template compound by elevating the temperature to a predetermined temperature in a stream of inert gas such as nitrogen and then introduce an oxygen to burn and thereby remove the residue. The calcination temperature may preferably be from 200 to 700° C., more preferably from 300 to 650° C., and most preferably from 400 to 600° C. If the calcination temperature is less than 200° C., the template compound may not be satisfactorily removed, whereas if it exceeds 700° C., the MWW crystal structure may be destroyed and this disadvantageously causes an adverse effect on the precursor performance in the case of calcination between the first step and the second step and on the obtained material in the case of calcination of the fifth step.

The calcination step other than the fifth step may also be performed according to the method of the fifth step.

The process for producing a modified layered material having an MWW-analogous structure of the present invention (I) is described in more detail below. The production process of the present invention (I) can be performed, for example, in the following manner.

That is, a layered precursor (precursor) which converts into MWW borosilicate upon calcination is synthesized from boric acid and a silicon-containing compound by using piperidine or hexamethyleneimine as the template (first step) and the obtained layered precursor borosilicate is acid-treated (second step) to synthesize a deboronated silicate (acid-treated precursor). Before the second step, the layered precursor may be calcined to convert into MWW borosilicate (first-2 step). The deboronated silicate is contacted with an element-containing compound by some method and treated in the presence of a swelling agent to synthesize an element-containing swollen layered precursor (third step), the manner of the stacking between layers of this element-containing layered precursor is modified (fourth step) and the precursor is further calcined to thereby obtain a modified crystalline layered material.

The modified layered metallosilicate material which has been obtained by the production process of the present invention (I) may be used as it is, for example, as a catalyst for an oxidation reaction, but the oxide of element resulting from condensation of an element itself present in the metallosilicate material which has been obtained by the production process and not contributing to the reaction may be at least partially removed by contacting it with an acid. By this contact with an acid, a metallosilicate catalyst having higher performance can be obtained.

The "contact with an acid" is effective even if it is performed before or after or both before and after the calcination in the fifth step, but this treatment is most effective when applied in the precursor (D) state before calcination (fourth-2 step). In particular, the production of an oxide of element as a by-product resulting from condensation of an element itself upon calcination can be greatly prevented.

The "contact with an acid" as used herein has the same meaning as the "contact with an acid" described with respect to the second step and the contacting method, the acid used for the contact, the concentration of acid used for the contact, the timing of contact, the solvent in the case of using the acid as a solution, and the like described with respect to the second step all can be applied here.

(Present Invention (II))

The present invention (II) is described below. The present invention (II) is a crystalline layered material modified in the manner of the stacking between layers and containing silicon and at least one element selected from the group consisting of elements belonging to Groups 3, 4, 5, 6, 7, 8, 9, 10, 11 and 12, gallium, indium, tin and lead, which can be efficiently produced by the process for producing a modified layered material having an MWW-analogous structure of the present invention (I). Furthermore, this is a material where at least a part of the element is introduced into the crystal framework.

In this modified layered material modified in the manner of the stacking between layers and having an MWW-analogous structure, as the metal species other than silicon, at least one element selected from the group consisting of titanium, zirconium, vanadium, niobium, tantalum, chromium, molybdenum, tungsten, manganese, iron, cobalt, nickel, zinc, gallium, indium, tin and lead is introduced into the framework.

As described above, the MWW structure can be characterized by its powder X-ray diffraction pattern. Similarly, the layered material having an MWW-analogous structure of the present invention can also be characterized by its powder X-ray diffraction pattern to a certain extent. The XRD patterns of layered materials produced through the fourth (a) step of the present invention are shown in Table 2. In other words, the required feature of the present invention (II) is to have the following diffraction lines in the XRD pattern.

TABLE 2

Powder X-Ray Diffraction Lines of Modified Layered Material Having MWW-analogous Structure

| d/Å | Relative Intensity |
|---|---|
| 12.2 ± 1 | w |
| 10.9 ± 0.6 | m |
| 8.7 ± 0.5 | m |
| 6.8 ± 0.4 | m |
| 6.1 ± 0.4 | w |
| 5.4 ± 0.3 | w |
| 3.9 ± 0.2 | w |
| 3.4 ± 0.2 | w |

When a transition metal is introduced into silicate, a characteristic absorption sometimes appear in the region from ultraviolet light to visible light. The appearance of a characteristic absorption in the UV-VIS spectrum can be used as one index for showing that the metal intended to be introduced is introduced into the silicate framework. The position of absorption band varies depending on the element but in many cases, absorption is present in the region of 300 nm or less, particularly 250 nm or less. Accordingly, the characteristic feature of the material of the present invention (II) is to have an absorption in such a region.

Another characteristic feature of the modified layered material of the present invention is to have a large pore volume. As a result of modification of the manner of the stacking between layers, the volume of pores in the region from mesopore to micropore is greatly increased as compared with normal layered materials or zeolite materials. For example, in the case of a modified layered material produced through the fourth (a) step of the present invention, the nitrogen adsorption amount measured at a liquid nitrogen temperature is, at a relative pressure of 0.95, 0.5 cm$^3$/g or more, further 0.6 cm$^2$/g or more, still further 0.75 cm$^3$/g or more.

The nitrogen adsorption amount is measured by contacting $N_2$ with a sample at a liquid nitrogen temperature and monitoring the pressure at equilibrium. When the amount of $N_2$ introduced is gradually increased and the equilibrium pressure is continuously monitored, an $N_2$ adsorption isotherm at the liquid nitrogen temperature can be obtained. In the present invention, the $N_2$ adsorption amount at a $N_2$ relative pressure of 0.95 and at a liquid nitrogen temperature is used as an index for showing the size of mesopore or micropore volume. If the relative pressure is close to 1, overestimation is liable to result due to the effect of condensation, whereas if it is too low, the obtained value does not sufficiently cover the volume of mircopores. This can be easily read from the adsorption isotherm of $N_2$. The $N_2$ adsorption amount is generally denoted as the amount of gas in the standard state in many cases, however, in the present invention, a value denoted as the volume of $N_2$ in the liquid state is used. This value can be determined from the volume of gas adsorbed by a simple calculation (such a measuring method of nitrogen adsorption amount is described, for example, in *Kyuchaku no Kagaku* (*Science of Adsorption*), page 147, Maruzen (1991)).

As still another characteristic feature, the modified layered material of the present invention has a by far larger outer surface area than MWW zeolite materials with a three-dimensional regularity. By virtue of this feature, even a large matrix which cannot enter the inside of a zeolite-like pore derived from MWW structure can be reacted. When the reactivity of cyclooctene incapable of entering the pore comprising an oxygen 10-membered ring is used as the index, the conversion ratio is at least 2 times, preferably 4 times or more, that of zeolite materials having a normal MWW structure.

Hereinbelow, the present invention will be described in more detail with reference to Examples.

EXAMPLES

The present invention is described in greater detail below by referring to Examples, however, these Examples only show the outline of the present invention and the present invention is not limited to these Examples.

[Analyzers in Examples and Comparative Examples]

Elementary Analysis Method of Zeolite Material

A zeolite material was weighed into a Teflon (registered trademark of E.I. du Pont de Nemours and Company) beaker and hydrofluoric acid (50 mass %) was added and dissolved. Pure water was added thereto and the component analysis of element introduced, silicon and boron was performed by using a desk-top plasma emission analyzer (JY38S) manufactured by Rigaku Sha.

The conditions were as follows.

Powder X-Ray Diffraction (XRD)

The powder X-ray diffraction pattern of the sample was measured by the following apparatus under the following conditions.

| | |
|---|---|
| Apparatus: | Powder X-Ray Analyzer MX-Labo manufactured by Mac Science. |
| Ray source: | CuKα ray (1.5405 Å) |
| Condition: | output: 40 kV-20 mA |
| Range: | 2Θ = 2 to 50° |
| Scanning speed: | 2°/min. |

Ultraviolet-Visible Absorption Spectrum (UV)

The ultraviolet-visible absorption spectrum was measured according to a diffusion reflection method by the following apparatus under the following conditions.
Apparatus: JASCO UV/VIS Spectrometer V-550 manufactured by JASCO Corporation
Measurement Range: 200 to 500 nm
Standard material for base line: $BaSO_4$ $N_2$ Adsorption The $N_2$ adsorption was measured by the following method under the following conditions and the $N_2$ adsorption amount in the liquid state was calculated from the amount of gas adsorbed at a relative pressure of 0.95.
Apparatus: Belsorp 28A manufactured by Bel Japan, Inc.
Measurement temperature: liquid nitrogen (77K)
Temperature of air thermostatic chamber: 313K
Equilibrium adsorption time: 300 sec Example 1

Preparation of Titanosilicate (1)

[Preparation and Acid-Treatment of MWW Borosilicate]

In 684 g of ion exchanged water, 243.2 g of piperidine (hereinafter simply referred to as "PI") (produced by Wako Pure Chemical Industries, Ltd., purity: 98%) was dissolved at 25° C. to prepare an aqueous piperidine solution. To this aqueous piperidine solution, 165.8 g of boric acid (produced by Wako Pure Chemical Industries, Ltd., purity: 99.5%) was added while vigorously stirring. After stirring for 30 minutes to completely dissolve the boric acid, 120 g of fumed silica (Cab-o-sil M7D) was added and the stirring was further continued for 2 hours to obtain a mixture of $1.SiO_2:0.67.B_2O_3:1.4.PI:19H_2O$ (by mol).

This mixture was transferred to a 20 liter-volume Teflon-made autoclave and stirred for 120 hours at a rotation speed of 100 rpm at a temperature of 170° C. After the completion of stirring, the contents were cooled to 25° C. and the solid product was separated from the contents by filtration and washed with ion exchanged water. The washing was repeated until the pH of the washing water became 9 or less. The thus-obtained solid product was dried at a temperature of 80° C. and calcined at a temperature of 600° C. The calcined solid product was then acid-treated at a temperature of 100° C. for 20 hours by adding 30 ml of 6 mol/liter nitric acid per g of the solid product. After the completion of acid treatment, the solid obtained by filtration was calcined at a temperature of 600° C. for 10 hours. The boron/silicon molar ratio of this solid (deboronated borosilicate A) was 0.0217. This solid was further acid-treated at a temperature of 100° C. for 20 hours by adding 30 ml of 6 mol/liter nitric acid per g of the solid. The boron/silicon molar ratio of the solid (deboronated borosilicate B) obtained by filtration after the completion of acid treatment was 0.0017.

[Preparation of Layered Precursor Titanosilicate Ti-MWW (P)]

In 30 g of ion exchanged water, 14.5 g of PI (produced by Wako Pure Chemical Industries, Ltd., purity: 98%) was dissolved at 25° C. to prepare an aqueous PI solution. To this aqueous PI solution, 2.3 g of tetrabutyl orthotitanate (produced by Wako Pure Chemical Industries, Ltd., purity: 95%) was added while vigorously stirring. After stirring for 30 minutes to completely hydrolyze the tetrabutyl orthotitanate, 10 g of the deboronated borosilicate B having a boron/silicon molar ratio of 0.0017, which was prepared in Example 1, was added and the stirring was further continued for 2 hours to obtain a mixture of $1.SiO_2:0.038.TiO_2:1.PI:10.H_2O$ (by mol).

This mixture was transferred to a 150 ml-volume Teflon-made autoclave and stirred for 158 hours at a rotation speed of 40 rpm at a temperature of 175° C. After the completion of stirring, the contents were cooled to 25° C. and the solid product was separated from the contents by filtration and washed with ion exchanged water. The washing was repeated until the pH of the washing water became 9 or less. The thus-obtained solid product was dried at a temperature of 80° C. to obtain layered titanosilicate Ti-MWW(P) which is a precursor of MWW zeolite. The titanium/silicon molar ratio of this layered material was 0.033 and the boron/silicon molar ratio was 0.0019.

[Modification of Ti-MWW(P)]

The obtained solid product Ti-MWW(P) was acid-treated at 100° C. for 18 hours by adding 20 ml of 2 mol/liter nitric acid per g of the solid product. The sample after the acid treatment was placed in an aqueous solution obtained by mixing 5.6 g of hexadecyltrimethyl bromide (produced by Aldrich, purity: 99%), 6.0 g of tetrapropylammonium hydroxide (produced by Tokyo Kasei Kogyo Co., Ltd.) and 12 g of ion exchanged water. The resulting slurry had a pH of 12.0. This slurry was heated at 80° C. and then left standing for 16 hours. The obtained suspension was treated in an ultrasonic irradiator at 300 W and 35 kHz for one hour and then, 2 mol/liter nitric acid was added to the slurry while stirring until the pH became 2 or less.

The solid matter was recovered by centrifugation and washed with ion exchanged water. The washing was repeated until the pH of the washing water became 9 or less. The thus-obtained solid product was dried at a temperature of 80° C. and then calcined at a temperature of 600° C. The resulting solid product was acid-treated at a temperature of 100° C. for 20 hours by adding 30 ml of 6 mol/liter nitric acid per g of the solid product. After the completion of acid treatment, the solid obtained by filtration was calcined at a temperature of 600° C. for 10 hours. The titanium/silicon molar ratio of the resulting modified layered material was 0.024.

FIG. 1 shows the XRD pattern of this modified layered material. It is seen that the modified layered material has the above-described characteristic feature of "Table 1". Furthermore, a diffraction line is present at the position similar to MWW zeolite material and this reveals that the modified layered material has an MWW-analogous structure.

Figure 2:
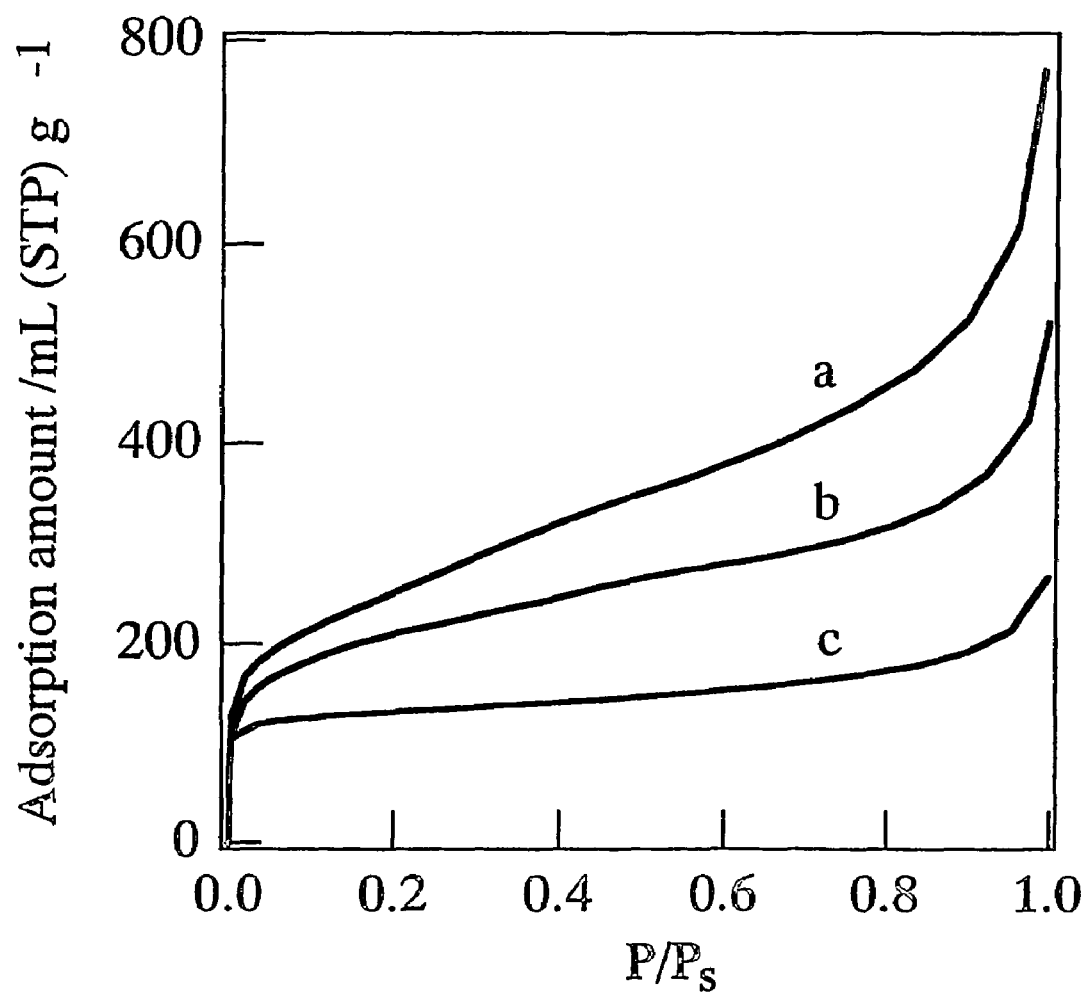
FIG. 2 is an N$_2$ adsorption isotherm of the material which has been obtained in Example 1 for (a), Example 2 for (b), and Comparative Example 1 for (c).
Figure 3:
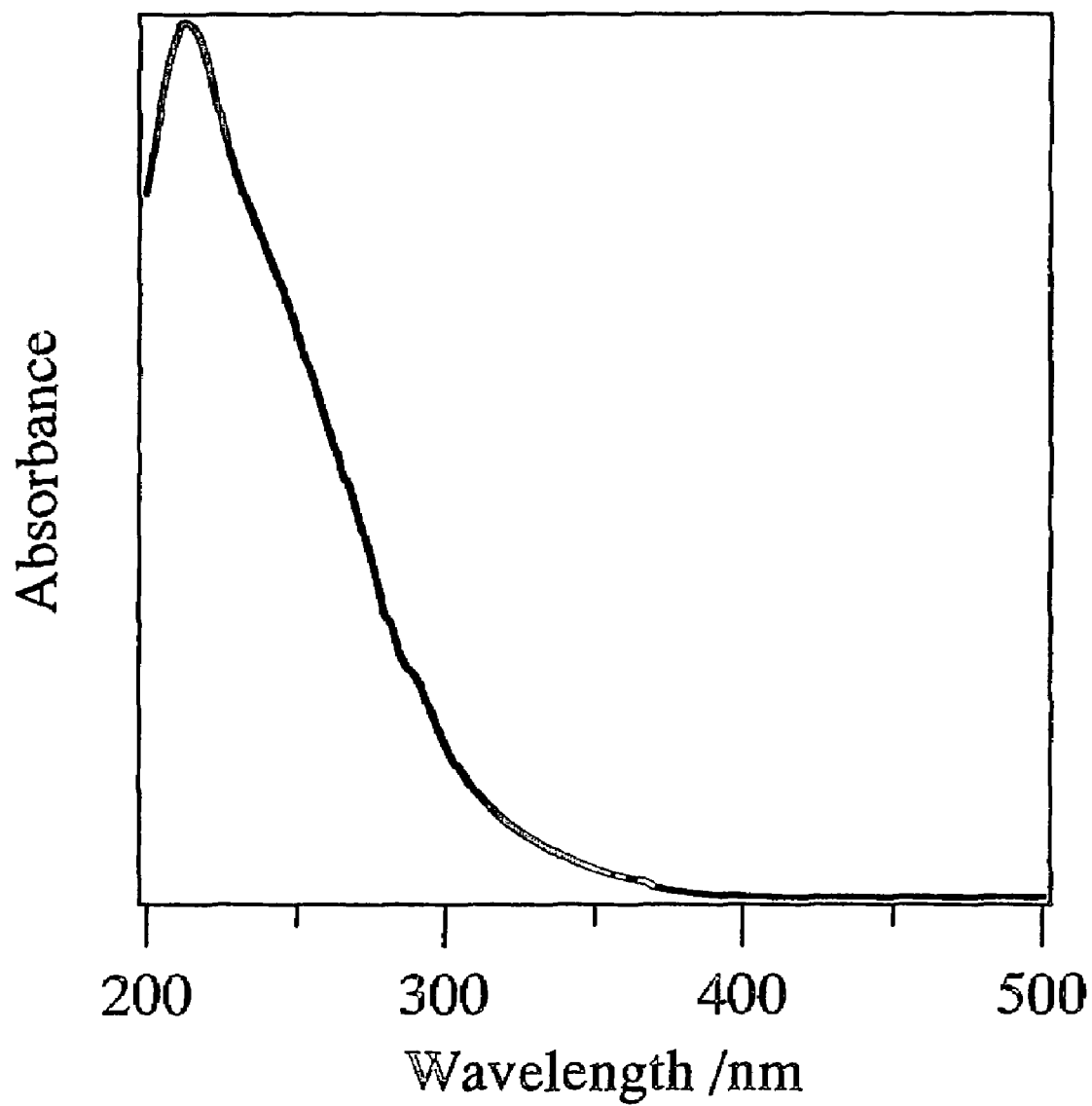
FIG. 3 is a UV spectrum of the material which has been obtained in Example 1.

FIG. 2(a) shows the $N_2$ adsorption isotherm of the modified layered material. The adsorption amount increases even in the region at a relative pressure of 0.1 or more and this reveals that the volume of mesopores and micropores is large. The $N_2$ adsorption amount at a relative pressure of 0.95 was 0.85 $cm^3/g$.

Example 2

Preparation of Titanosilicate (2)

A modified layered titanosilicate was obtained in the same manner as in Example 1 except that the ultrasonic irradiation and the subsequent adjustment of pH by the addition of nitric acid were not performed. The titanium/silicon molar ratio of this modified layered material was 0.026.

FIG. 2(b) shows the N₂ adsorption isotherm of the modified layered material. The N₂ adsorption amount at a relative pressure of 0.95 was 0.56 cm³/g.

Comparative Example 1

Preparation of MWW Titanosilicate

The solid product obtained in the preparation of Ti-MWW (P) of Example 1 was calcined at a temperature of 600° C. for 10 hours to obtain a titanosilicate having an MWW structure.

Figure 4:
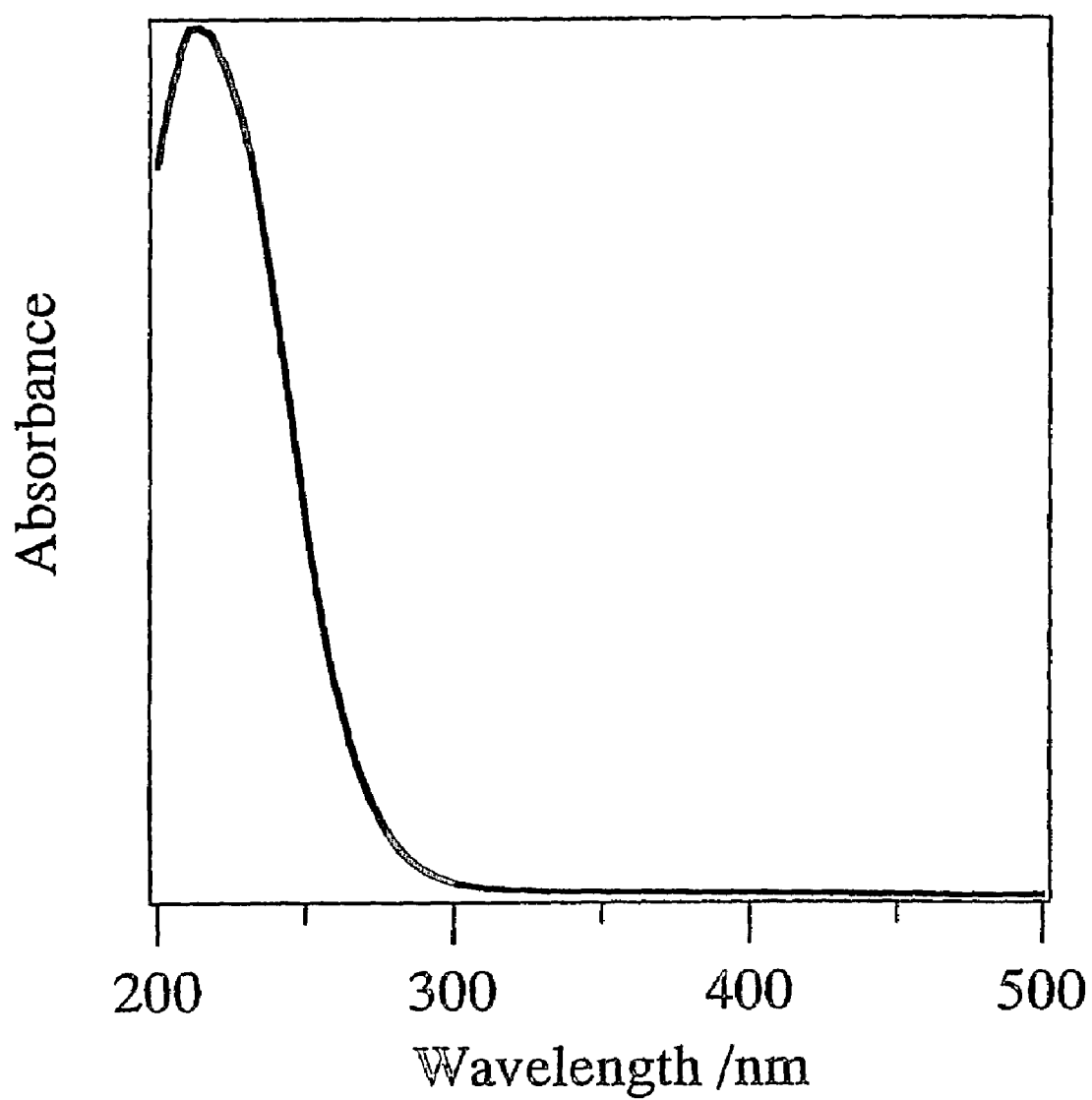
FIG. 4 is a UV spectrum of the material which has been obtained in Comparative Example 1.

FIG. 2(c) shows the N₂ adsorption isotherm of this zeolite material. The N₂ adsorption amount at a relative pressure of 0.95 was 0.30 cm³/g. FIG. 4 shows the UV spectrum.

INDUSTRIAL APPLICABILITY

As described hereinabove, unlike the conventionally known production processes for a layered material having an MWW-analogous structure, the production process (production process for a modified layered material having an MWW-analogous structure) according to the present invention can introduce an element having a large ionic radius (which is difficult to be introduced into the framework in the conventional process) can be introduced into the framework with good efficiency, and the present invention can provide a layered material containing such an element in the framework and having an MWW-analogous structure, which is difficult to be obtained in the conventional process.

The invention claimed is:

1. A process for producing a modified layered metallosilicate material, comprising the following first to fifth steps:
   First Step:
   a step of heating a mixture containing a template compound, a boron compound, a silicon-containing compound and water to thereby obtain a precursor (A);
   Second Step:
   a step of acid-treating the precursor (A) obtained in the first step, to thereby obtain a precursor (B);
   Third Step:
   a step of heating the precursor (B) obtained in the second step in the presence of a swelling agent so as to swell the precursor (B) to thereby obtain a precursor (C);
   Fourth Step:
   a step of modifying the manner of the stacking between layers in the precursor (C) obtained in the third step, to thereby obtain a precursor (D); and
   Fifth Step:
   a step of calcining the precursor (D) obtained in the fourth step, to thereby obtain a modified layered metallosilicate material.

2. The process for producing a modified layered metallosilicate material according to claim 1, wherein the following first-2 step is performed between the first step and the second step and the precursor (A') obtained in the first-2 step is used as the precursor (A) in the second step:
   First-2 Step:
   a step of calcining a part or the whole of the precursor (A) obtained in the first step.

3. The process for producing a modified layered metallosilicate material according to claim 2, wherein the calcining temperature in the first-2 step is from 200 to 700° C.

4. The process for producing a modified layered metallosilicate material according to claim 1, wherein the swelling agent is a surfactant.

5. The process for producing a modified layered metallosilicate material according to claim 1, wherein the pH at the time of the contact with the swelling agent in the third step is from 10 to 14.

6. The process for producing a modified layered metallosilicate material according to claim 5, wherein the pH at the time of the contact with the swelling agent in the third step is from 11 to 12.5.

7. The process for producing a modified layered metallosilicate material according to claim 1, wherein the temperature at the contact with the swelling agent in the third step is from 50 to 180° C.

8. The process for producing a modified layered metallosilicate material according to claim 1, wherein the following second-2 step is performed between the second step and the third step and the precursor (B') obtained in the second-2 step is used as the precursor (B) in the third step:
   Second-2 Step:
   a step of heating the precursor (B) obtained in the second step together with the template compound, water and a compound containing at least one element selected from the elements belonging to Groups 3 to 14 of the periodic table to thereby obtain a precursor (B').

9. The process for producing a modified layered metallosilicate material according to claim 8, wherein the following second-3 step is performed between the second-2 step and the third step and the precursor (B") obtained in the second-3 step is used as the precursor (B) in the third step:
   Second-3 Step:
   a step of acid-treating the precursor (B') obtained in the second-2 step, to thereby obtain a precursor (B").

10. The process for producing a modified layered metallosilicate material according to claim 8, wherein the heating temperature in the second-2 step is from 110 to 200° C.

11. The process for producing a modified layered metallosilicate material according to claim 8, wherein in the second-2 step, the precursor (B) acid-treated in the second step and a mixture containing a template compound and water are charged by isolating these from each other and a dry gel method of bringing a vapor of the mixture containing a template compound and water into contact with a mixture of the precursor (B) and a compound containing at least one element selected from the elements belonging to Groups 3 to 14 of the periodic table is used.

12. The process for producing a modified layered metallosilicate material according to claim 8, wherein the at least one element selected from the elements belonging to Groups 3 to 14 of the periodic table used in the second-2 step is at least one element selected from the group consisting of titanium, zirconium, vanadium, niobium, tantalum, chromium, molybdenum, tungsten, manganese, iron, cobalt, nickel, zinc, gallium, indium, tin and lead.

13. The process for producing a modified layered metallosilicate material according to claim 1, wherein in the third step, a compound containing at least one element selected from the elements belonging to Groups 3 to 14 of the periodic table is co-present with the precursor which has been acid-treated in the second step.

14. The process for producing a modified layered metallosilicate material according to claim 13, wherein in the third step, an amine is co-present.

15. The process for producing a modified layered metallosilicate material according to claim 1, wherein the fourth step is the following fourth (a) step:
   Fourth (a) Step:
   a step of delaminating at least a part of the swollen precursor (C) obtained in the third step.

16. The process for producing a modified layered metallosilicate material according to claim 15, wherein in the fourth (a) step, the delamination is performed by the stirring and/or ultrasonic irradiation.

17. The process for producing a modified layered metallosilicate material according to claim 1, wherein the fourth step is the following fourth (b) step:

Fourth (b) Step:
a step of interlayer crosslinking a part or the whole of the swollen precursor (C) obtained in the third step.

18. The process for producing a modified layered metallosilicate material according to claim 17, wherein the crosslinking agent is a silicon-containing compound.

19. The process for producing a modified layered metallosilicate material according to claim 1, wherein the following fourth-2 step is performed between the fourth step and the fifth step and the precursor (D') obtained in the fourth-2 step is used as the precursor (D) in the fifth step:

Fourth-2 Step:
a step of acid-treating the precursor (D) obtained in the fourth step, to thereby obtain a precursor (D').

20. The process for producing a modified layered metallosilicate material according to claim 1, wherein the template compound is a nitrogen-containing compound.

21. The process for producing a modified layered metallosilicate material according to claim 20, wherein the nitrogen-containing compound is an amine or a quaternary ammonium compound.

22. The process for producing a modified layered metallosilicate material according to claim 20, wherein the nitrogen-containing compound is at least one or more member selected from the group consisting of piperidine, hexamethyleneimine and a mixture of piperidine and hexamethyleneimine.

23. The process for producing a modified layered metallosilicate material according to claim 1, wherein the boron-containing compound is at least one or more member selected from the group consisting of boric acid, borates, boron oxides, boron halides and trialkylborons.

24. The process for producing a modified layered metallosilicate material according to claim 1, wherein the silicon-containing compound is at least one or more member selected from the group consisting of silicic acid, silicates, silicon oxides, silicon halides, fumed silicas, tetraalkyl orthosilicates and colloidal silicas.

25. The process for producing a modified layered metallosilicate material according to claim 1, wherein the ratio of boron and silicon in the mixture of the first step is, in terms of the molar ratio, boron:silicon=0.01 to 10:1.

26. The process for producing a modified layered metallosilicate material according to claim 1, wherein the ratio of water and silicon in the mixture of the first step is, in terms of the molar ratio, water:silicon=5 to 200:1.

27. The process for producing a modified layered metallosilicate material according to claim 1, wherein the ratio of template compound and silicon in the mixture of the first step is, in terms of the molar ratio, template compound:silicon=0.1 to 5:1.

28. The process for producing a modified layered metallosilicate material according to claim 1, wherein the heating temperature in the first step is from 110 to 200° C.

29. The process for producing a modified layered metallosilicate material according to claim 1, wherein the acid used for the acid-treatment in the second step is nitric acid.

30. The process for producing a modified layered metallosilicate material according to claim 1, wherein the calcining temperature in the fifth step is from 200 to 700° C.

31. A modified layered metallosilicate material characterized by the powder X-ray diffraction line shown in the following Table and having a nitrogen adsorption amount of 0.5 $cm^3/g$ or more under a relative pressure of 0.95 as measured at a liquid nitrogen temperature.

TABLE

| Powder X-Ray Diffraction Lines Given by Modified Layered Material Having MWW-analogous Structure | |
|---|---|
| d/Å | Relative Intensity |
| 12.2 ± 1 | w |
| 10.9 ± 0.6 | m |
| 8.7 ± 0.5 | m |
| 6.8 ± 0.4 | m |
| 6.1 ± 0.4 | w |
| 5.4 ± 0.3 | w |
| 3.9 ± 0.2 | w |
| 3.4 ± 0.2 | w |

32. The modified layered metallosilicate material according to claim 31, which comprises at least one element selected from the group consisting of titanium, zirconium, vanadium, niobium, tantalum, chromium, molybdenum, tungsten, manganese, iron, cobalt, nickel, zinc, gallium, indium, tin and lead.

33. The modified layered metallosilicate material according to claim 31, which is synthesized by the production process comprising the following first to fifth steps:

First Step:
a step of heating a mixture containing a template compound, a boron compound, a silicon-containing compound and water to thereby obtain a precursor (A);

Second Step:
a step of acid-treating the precursor (A) obtained in the first step, to thereby obtain a precursor (B);

Third Step:
a step of heating the precursor (B) obtained in the second step in the presence of a swelling agent so as to swell the precursor (B) to thereby obtain a precursor (C);

Fourth Step:
a step of modifying the manner of the stacking between layers in the precursor (C) obtained in the third step, to thereby obtain a precursor (D); and Fifth Step:
a step of calcining the precursor (D) obtained in the fourth step, to thereby obtain a modified layered metallosilicate material.

* * * * *